US012373547B2

(12) United States Patent
Liu (10) Patent No.: US 12,373,547 B2
(45) Date of Patent: Jul. 29, 2025

(54) PREVENTING REPLACEMENT AND CLONE ATTACKS USING A SECURE PROCESSING ENVIRONMENT

(71) Applicant: Micron Technology, Inc., Boise, ID (US)

(72) Inventor: Zhan Liu, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 336 days.

(21) Appl. No.: 17/898,375

(22) Filed: Aug. 29, 2022

(65) Prior Publication Data

US 2024/0070262 A1   Feb. 29, 2024

(51) Int. Cl.
*G06F 21/53*   (2013.01)
*G06F 21/64*   (2013.01)

(52) U.S. Cl.
CPC .............. *G06F 21/53* (2013.01); *G06F 21/64* (2013.01); *G06F 2221/031* (2013.01)

(58) Field of Classification Search
CPC ..... G06F 21/53; G06F 21/64; G06F 2221/031

USPC .......................................................... 726/22
See application file for complete search history.

(56) References Cited

U.S. PATENT DOCUMENTS

| 10,891,366 | B1 * | 1/2021 | Wu ....................... H04L 9/0866 |
| 2019/0163912 | A1 * | 5/2019 | Kumar .................. H04L 9/0877 |
| 2019/0305973 | A1 * | 10/2019 | Dewan ..................... H04L 9/14 |

* cited by examiner

*Primary Examiner* — Benjamin A Kaplan
(74) *Attorney, Agent, or Firm* — Greenberg Traurig (57) ABSTRACT

In some aspects, the techniques described herein relate to a device including: a storage device, the storage device including a first physically unclonable function (PUF) and configured to generate a storage device public key and a storage device private key; and a secure environment, the secure environment including a controller configured for: transmitting a nonce value to the storage device; receiving a response from the storage device, the response including a unique identifier (UID) and a digital signature, the digital signature generated using the UID and the nonce value; validating the digital signature using a public key of the storage device; and issuing a command to the storage device after validating the digital signature.

20 Claims, 5 Drawing Sheets

PREVENTING REPLACEMENT AND CLONE ATTACKS USING A SECURE PROCESSING ENVIRONMENT

FIELD OF THE TECHNOLOGY

At least some embodiments disclosed herein relate generally to the security of computing systems and, in particular, preventing replacement and cloning attacks on computing systems.

BACKGROUND

Computing systems are subject to various forms of attacks that compromise the security and integrity of these systems. One such attack is a replacement attack. In a replacement attack, a component (e.g., a persistent storage device or volatile memory device) is replaced with a malicious component that enables unauthorized access to the computing system. Another type of attack is a cloning attack. In this type of attack, the contents of a storage device are copied into a second storage device. This second storage device is then used to operate a copy of the computing system, allowing malicious users to access the cloned data via a cloned computing system. For example, in some scenarios, the contents of the storage device may include data representing the identity of the storage device (e.g., a unique identifier, etc.). If such a storage device (and the identity data) is cloned, a malicious can store any other malicious data and other devices that verify the storage device based on the identity data will trust the malicious data.

DETAILED DESCRIPTION

The example embodiments provide solutions for preventing attacks on computing systems and, in particular, to preventing replacement and cloning attacks. In the various embodiments, a computing system includes a storage device (e.g., Flash, random-access memory, etc.) and a secure processing environment such as a trusted execution environment (TEE), secure enclave, hardware security module (HSM), etc. The storage device can generate an asymmetric key pair via a secure mechanism such as a physically unclonable function (PUF). The secure processing environment stores a copy of the public key of the storage device. When accessing the storage device, the secure processing environment transmits a nonce to the storage device which then generates a digital signature using a private key corresponding to the storage device's public key. The secure processing environment can then validate the signature using the public key of the storage device. Based on this validation, access to the storage device can be granted or denied.

In some aspects, the techniques described herein relate to a device including: a storage device, the storage device including a first physically unclonable function (PUF) and configured to generate a storage device public key and a storage device private key; and a secure environment, the secure environment including a controller configured for: transmitting a nonce value to the storage device; receiving a response from the storage device, the response including a unique identifier (UID) and a digital signature, the digital signature generated using the UID and the nonce value; validating the digital signature using a public key of the storage device; and issuing a command to the storage device after validating the digital signature.

In some aspects, the techniques described herein relate to a device, the controller further configured for receiving the command prior to transmitting the nonce value.

In some aspects, the techniques described herein relate to a device, the controller further configured for receiving the storage device public key from the storage device in response to a signed replace key command, the signed replace key command received from a key management server and signed using a private key corresponding to a key management server public key stored by the secure environment and the storage device.

In some aspects, the techniques described herein relate to a device, wherein the response further includes a copy of the nonce value and the controller is further configured for validating that the copy of the nonce value is equal to the nonce value.

In some aspects, the techniques described herein relate to a device, the controller further configured for receiving a second response from a second storage device and disallowing a command accessing the second storage device upon determining that a second digital signature generated by the second storage device is not valid.

In some aspects, the techniques described herein relate to a device, wherein the secure environment includes a trusted execution environment and the storage device includes one of a persistent storage device or a volatile storage device.

In some aspects, the techniques described herein relate to a method including: transmitting, by a secure environment, a nonce value to a storage device; receiving, by the secure environment, a response from the storage device, the response including a unique identifier (UID) and a digital signature, the digital signature generated using the UID and the nonce value; validating, by the secure environment, the digital signature using a public key of the storage device; and issuing, by the secure environment, a command to the storage device after validating the digital signature.

In some aspects, the techniques described herein relate to a method, further including receiving the command prior to transmitting the nonce value.

In some aspects, the techniques described herein relate to a method, wherein the public key of the storage device includes a public key derived from a physically unclonable function of the storage device.

In some aspects, the techniques described herein relate to a method, further including receiving the public key from the storage device in response to a signed replace key command, the signed replace key command received from a key management server and signed using a private key corresponding to a key management server public key stored by the secure environment and the storage device.

In some aspects, the techniques described herein relate to a method, wherein the response further includes a copy of the nonce value and the method further includes validating that the copy of the nonce value is equal to the nonce value.

In some aspects, the techniques described herein relate to a method, further including receiving a second response from a second storage device and disallowing a command accessing the second storage device upon determining that a second digital signature generated by the second storage device is not valid.

In some aspects, the techniques described herein relate to a method, wherein the secure environment includes a trusted execution environment and the storage device includes one of a persistent storage device or a volatile storage device.

In some aspects, the techniques described herein relate to a non-transitory computer-readable storage medium for tangibly storing computer program instructions capable of being executed by a computer processor, the computer program instructions defining steps of: transmitting, by a secure environment, a nonce value to a storage device; receiving, by the secure environment, a response from the storage device, the response including a unique identifier (UID) and a digital signature, the digital signature generated using the UID and the nonce value; validating, by the secure environment, the digital signature using a public key of the storage device; and issuing, by the secure environment, a command to the storage device after validating the digital signature.

In some aspects, the techniques described herein relate to a non-transitory computer-readable storage medium, further including receiving the command prior to transmitting the nonce value.

In some aspects, the techniques described herein relate to a non-transitory computer-readable storage medium, wherein the public key of the storage device includes a public key derived from a physically unclonable function of the storage device.

In some aspects, the techniques described herein relate to a non-transitory computer-readable storage medium, further including receiving the public key from the storage device in response to a signed replace key command, the signed replace key command received from a key management server and signed using a private key corresponding to a key management server public key stored by the secure environment and the storage device.

In some aspects, the techniques described herein relate to a non-transitory computer-readable storage medium, wherein the response further includes a copy of the nonce value and the steps further include validating that the copy of the nonce value is equal to the nonce value.

In some aspects, the techniques described herein relate to a non-transitory computer-readable storage medium, further including receiving a second response from a second storage device and disallowing a command accessing the second storage device upon determining that a second digital signature generated by the second storage device is not valid.

In some aspects, the techniques described herein relate to a non-transitory computer-readable storage medium, wherein the secure environment includes a trusted execution environment and the storage device includes one of a persistent storage device or a volatile storage device.

Figure 1:
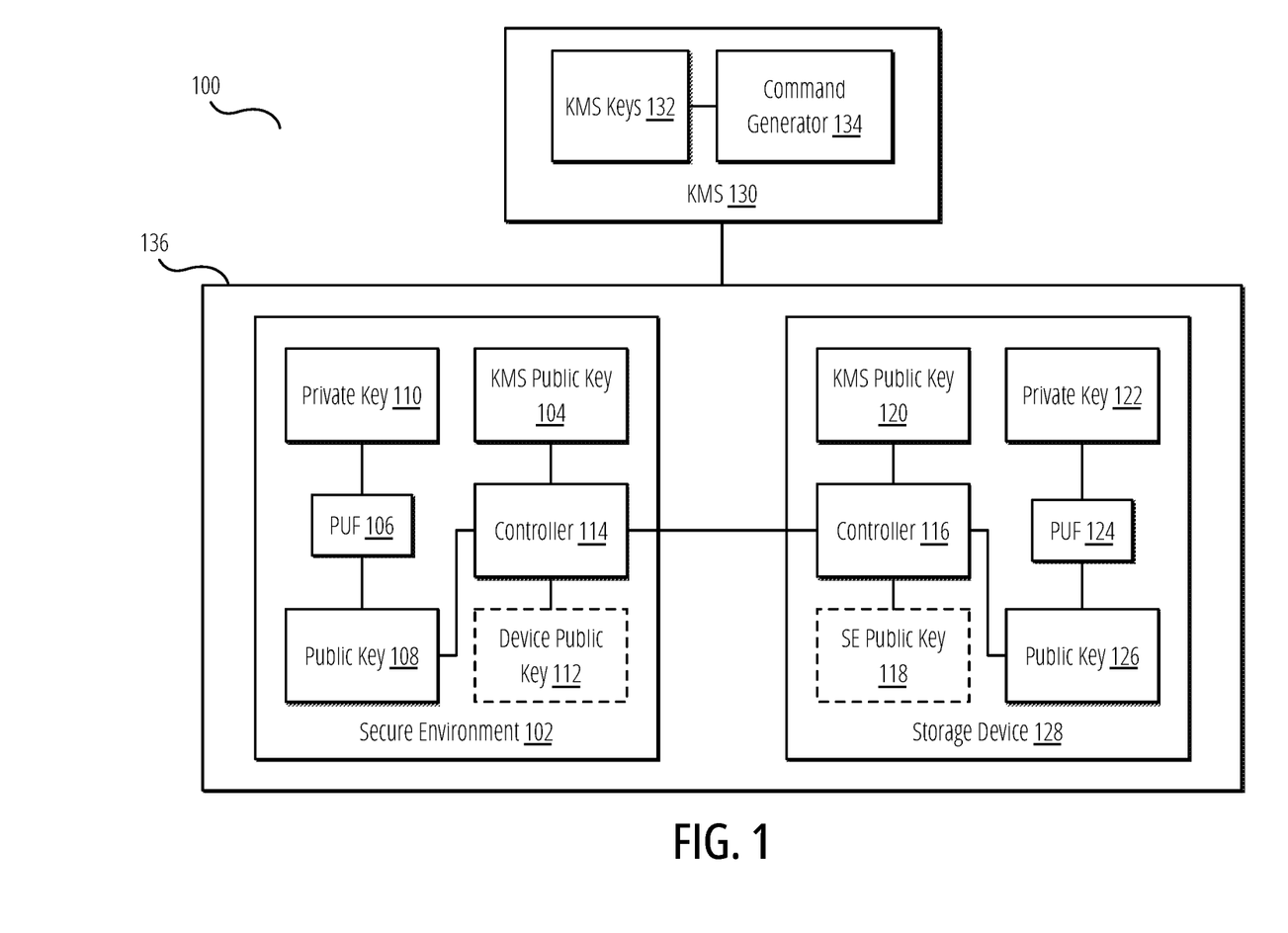
FIG. 1 is a block diagram of a secure computing system.

FIG. 1 is a block diagram of a secure computing system.

System 100 includes a key management server 130 and a secure computing device 136. The key management server 130 can perform various operations to manage keys and other cryptographic data for external devices such as secure computing device 136, however only a subset of those operations necessary for understanding the example embodiments are described herein.

Key management server 130 includes keys 132. These keys can be asymmetric keys. As such, the keys 132 can include at least one public key and at least one private key. Keys 132 are referred to as KMS keys or, individually, as the KMS public key and the KMS private key. Keys 132 can be generated using any suitable asymmetric algorithm including, but not limited to, Rivest-Shamir-Adleman (RSA) or Elliptic Curve Digital Signature Algorithm (ECDSA) algorithms. In an implementation, keys 132 can be stored securely in a hardware security module (HSM), trusted execution environment (TEE), Secure Enclave, or similar type of secure storage mechanism.

Key management server 130 also includes a command generator 134. In an implementation, command generator 134 can be a software or hardware device that generates secure commands to transmit to the secure computing device 136. As will be described in more detail, command generator 134 can be configured to generate a command that causes secure environment 102 and storage device 128 to exchange public keys. In an implementation, command generator 134 can include a digital signature algorithm or circuit that signs the commands using one of the keys 132 (e.g., the KMS private key). In some implementations, command generator 134 can receive a request for a signed command from secure computing device 136. In other implementations, command generator 134 may independently issue commands to the secure computing device 136. In yet other implementations, another external device (not illustrated) may request that the command generator 134 issue a signed command to secure computing device 136.

The secure computing device 136 includes a secure environment 102 and storage device 128. As illustrated, the secure environment 102 and storage device 128 electronically communicate with each other. Specifically, secure environment 102 may mediate all requests for data stored in a storage array (not illustrated) of storage device 128. Storage device 128 can be any type of storage device including, but not limited to, a persistent storage device (e.g., hard drive, solid-state drive, Universal Flash Storage, embedded MultiMedia Card, Subscriber Identity Module card, Secure Digital card, Flash drive, etc.) or volatile memory (e.g., random-access memory). Specifically, details of data storage operations of storage device 128 are not described herein for the sake of brevity. In some implementations, the secure environment 102 can be a TEE, HSM, Secure Enclave, or similar type of secure environment.

Secure environment 102 includes a controller 114 that receives requests from external devices and issues requests to external data including storage device 128. The connection between controller 114 and controller 116 of storage device 128 may form a data path for the accessing of data stored in storage device 128. Further, both controller 114 and controller 116 may use the data path to receive commands from key management server 130, including signed commands by command generator 134. Both controller 114 and controller 116 may comprise microcontrollers, microprocessors, or other types of integrated circuits executing firmware (or including dedicated circuitry) for performing the various functions described herein.

Secure environment 102 stores various keys for use during the operations described herein. Specifically, secure environment 102 includes a copy of the KMS public key 104. As discussed, the KMS public key 104 may comprise a public key stored in keys 132 and generated by the key management server 130. In some implementations, KMS public key 104 may be written to the secure environment 102 during manufacturing of the 136 and may be stored in a write-protected region of the secure environment 102. Secure environment 102 further includes an asymmetric key pair including a secure environment public key 108 and a secure environment private key 110. In some implementations, these keys can be generated locally by the secure environment 102. For example, in an implementation, the secure environment 102 includes a physically unclonable function 106 (PUF). The physically unclonable function 106 may comprise a physical hardware circuit that exploits inherent randomness introduced during manufacturing to give a physical entity a unique "fingerprint" or trust anchor. In the illustrated embodiment, the physically unclonable function 106 produces a consistent and repeatable value. In some embodiments, the physically unclonable function 106 may comprise a static random-access memory (SRAM), Delay PUF, or any other PUF technology implemented on the secure computing device 136. In an implementation, the secure environment 102 can read a PUF value from physically unclonable function 106 and use the PUF value as a seed value during key generation. In some implementations, the private key 110 and public key 108 may be an asymmetric key pair such as an RSA or ECDSA key pair. In some implementations, the private key 110 and public key 108 may be persistently stored. In other implementations, the private key 110 and public key 108 may not be persistently stored and may be regenerated as needed from the physically unclonable function 106 value. As will be illustrated, the private key 110 and public key 108 represent the cryptographic identity of secure environment 102.

In an implementation, storage device 128 is structurally similar to secure environment 102 and various details of secure environment 102 are not repeated herein. For example, the storage private key 122 and storage public key 126 may be asymmetric (e.g., RSA or ECDSA) keys generated from a physically unclonable function 124. The physically unclonable function 124 may be similar or identical to physically unclonable function 106. Further, the storage device 128 also stores the KMS public key 120 (similar to KMS public key 104). As with secure environment 102, the KMS public key 120 may be written to the storage device 128 by the key management server 130 during manufacturing of secure computing device 136.

Finally, the secure environment 102 can include a copy of the public key 126 (device public key 112) while the storage device 128 can include a copy of the secure environment public key 108 (secure environment public key 118). As will be discussed, initially the secure environment 102 and storage device 128 may not hold these public keys (as illustrated by dash lines of device public key 112 and secure environment public key 118. As will be described next, the key management server 130, secure environment 102 (via controller 114), and storage device 128 (via controller 116) may communicate and operate to enable the exchange of public keys between secure environment 102 and storage device 128 based on a signed command generated by command generator 134.

Figure 2:
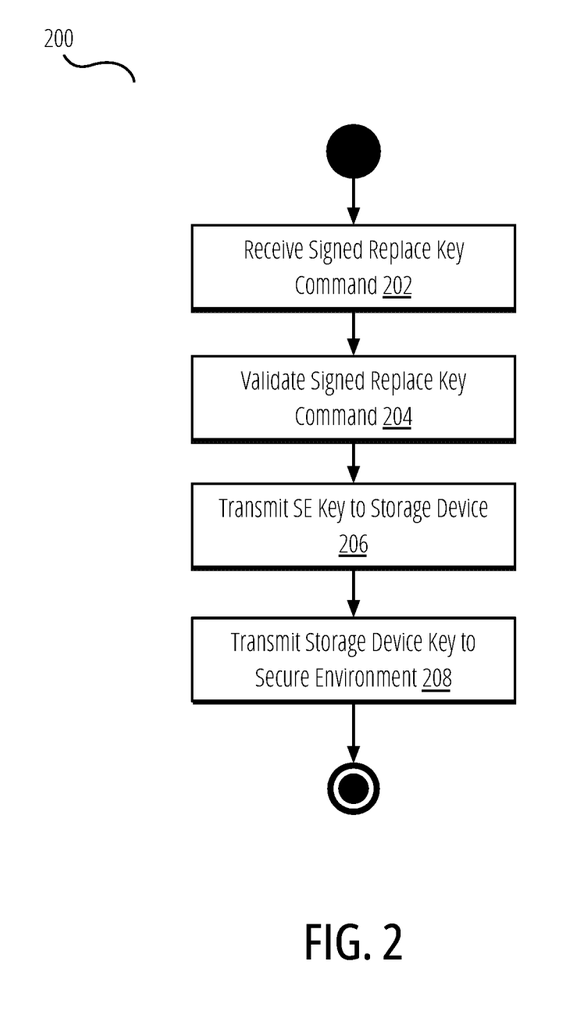
FIG. 2 is a flow diagram illustrating a method for securely exchanging cryptographic keys between a secure environment and a storage device in a secure computing device.

FIG. 2 is a flow diagram illustrating a method for securely exchanging cryptographic keys between a secure environment and a storage device in a secure computing device.

In step 202, method 200 can include receiving a signed replace key command.

In some implementations, a secure computing device can receive the signed replace key command from a key management server (KMS) or similar computing system. As discussed, the signed replace key command is signed using the private key of the KMS or other trusted entity. In some implementations, the secure computing device can request the command from the KMS. Alternatively, or in conjunction with the foregoing, the KMS can independently transmit the signed replace key command to the secure computing system. In some implementations, method 200 can receive the signed replace key command at any time. In some implementations, method 200 can receive the signed replace key command during manufacturing, while in other implementations, the command may be received after the secure computing system is released from manufacturing.

In some implementations, either the secure environment or the storage device can issue a request for a signed replace key command. Alternatively, or in conjunction with the foregoing, either the secure environment or the storage device can receive such a signed replace key command by the initiative of the KMS. Thus, both secure environment and storage device can execute method 200 and distinctions between the two are not provided unless useful to elaborate on specific operations for each device.

In step 204, method 200 can include validating the signed replace command.

In some implementations, method 200 can be executed by both a secure environment (e.g., TEE, HSM, etc.) as well as a storage device. That is, the secure environment and storage device can both independently validate a signed replace key command. Both devices may execute the same validation procedure. In some implementations, this validation procedure can include reading a KMS public key from a secure storage area (e.g., write-protected area) of the respective device. The procedure can then include hashing the command to generate a first hash and decrypting the signature using the KMS public key to generate a second hash. If the first hash and the second hash match, the respective device can validate the signed replace key command. Otherwise, the respective device can ignore the command. In some implementations, both the secure environment and the storage device must independently validate the signed replace key command to proceed to step 206. Thus, after step 204, both the secure environment and the storage device can be assured that the replace key command is being transmitted by a trusted party (e.g., the KMS).

In step 206, method 200 can include storing the key data after validating the signed replace key command. As discussed in FIG. 1, the secure environment and storage device can both store the KMS public key and thus can each independently validate signed commands received from the KMS. The signed replace key command can cause either the secure environment or storage device to perform various operations in step 206 described herein.

In a first implementation, a secure environment may receive the signed replace key command. As discussed, this signed replace key command can include a command that instructs the secure environment to retrieve the storage device public key from the storage device and store the storage device public key in a secure area of the secure environment. Since the secure environment can validate that the signed command was properly issued from the KMS it can trust the command.

In a second implementation, the KMS can send the signed replace key command to the secure environment, instructing the secure environment to store an additional storage device public key in a secure area of the secure environment. For example, a secure computing system may include a solid-state drive and RAM. The KMS may issue separate signed replace key commands for the RAM and then for the solid-state drive. Thus, the secure environment will request and store public keys for both the solid-state drive and the RAM (i.e., two public keys). No limit is placed on the total number of keys the secure environment can store.

In a third implementation, the KMS can also send a signed replace key command to the storage device(s) in the secure computing system. In this implementation, the storage device can request the secure environment public key and then store the secure environment public key in a secure storage area (e.g., TEE, HSM, etc.). Certainly, the foregoing three implementations can be implemented at the same time in the secure computing system.

In some implementations, during step 206, a storage device can also return a unique identifier (UID) that identifies the storage device when providing its public key to the secure environment. For example, the UID may comprise a globally unique identifier (GUID), serial number, or other type of identifying data. In response, the secure environment can store this UID in a secure location (e.g., write-protected region of memory) for later use (as discussed in FIG. 3).

Thus, at the completion of method 200, both the secure environment and the storage device(s) exchange cryptographic identities. Further, this exchange can only be initiated by a trusted KMS or similar system. As discussed next, these public keys can then be used to verify messages exchanged between the secure environment and the storage device.

Figure 3:
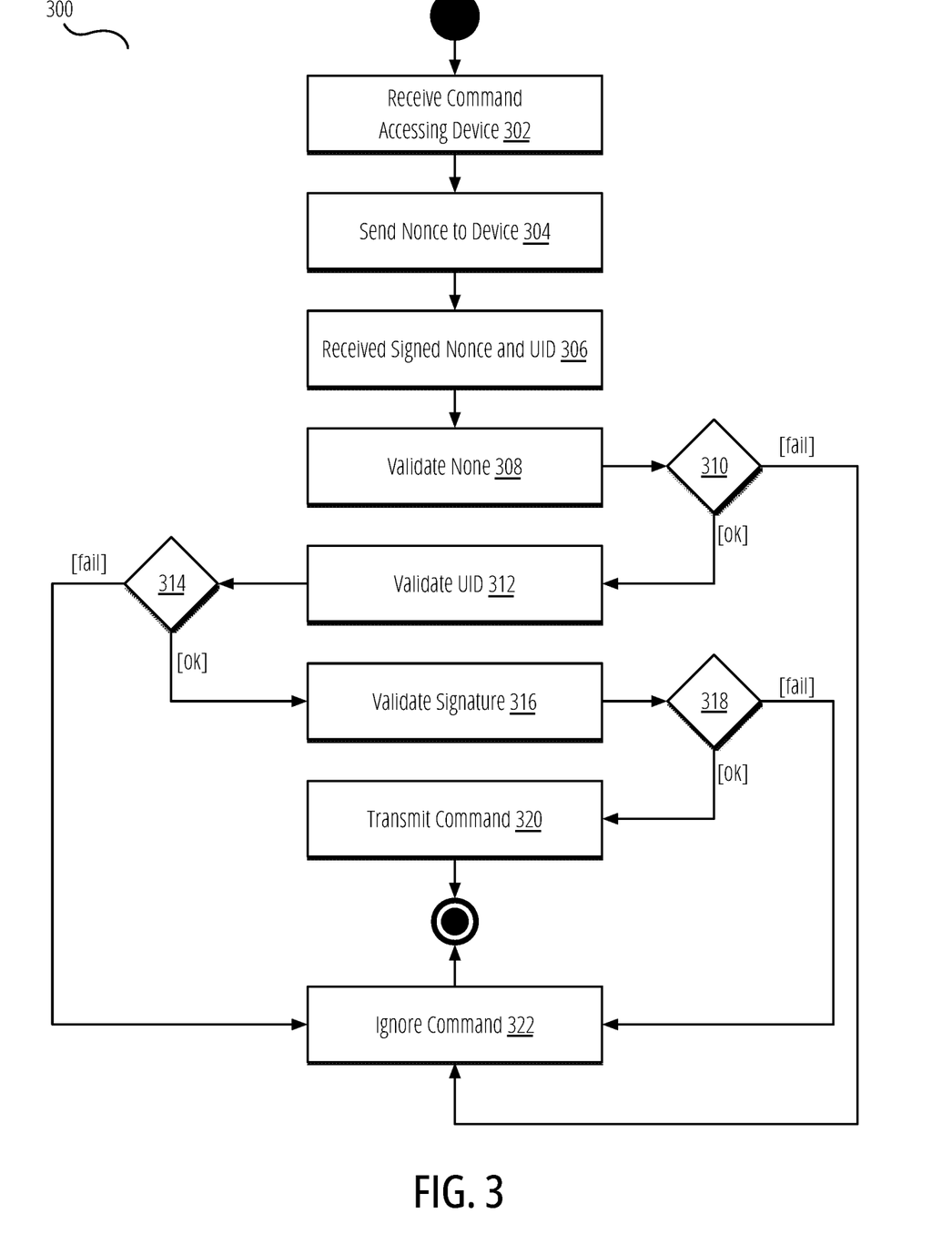
FIG. 3 is a flow diagram illustrating a method for securing communications between a secure environment and a storage device.

FIG. 3 is a flow diagram illustrating a method for securing communications between a secure environment and a storage device.

In step 302, method 300 can include receiving a command to access data (e.g., read or write) stored by a storage device. In some implementations, method 300 can be executed by a secure environment. In some implementations, this secure environment can be located within a computing device that also includes a storage device (e.g., random-access memory, Flash, etc.). In some implementations, the secure environment can be configured to mediate all commands accessing the storage device. Examples of commands include, but are not limited to, read and write commands. In some implementations, method 300 may be performed for every command. Alternatively, or in conjunction with the foregoing, method 300 may be performed only on startup or shutdown.

In step 304, method 300 can include sending a nonce value to the storage device. In an implementation, the nonce value can include any type of random or pseudo-random value. In some implementations, the nonce value can also include a timestamp value. In some implementations, the nonce value can be a monotonic counter value. Generally, the nonce value comprises a unique value that is generated for each command sent to the storage device. In some implementations, the secure environment can generate this nonce value and issue a command to the storage device. In some implementations, this command can be a dedicated command for authenticating the storage device.

In step 306, method 300 can include receiving a signed nonce and unique identifier (UID).

In response to the command, the storage device can return its unique identifier (UID) and the nonce. The storage device can further use a private key to generate a digital signature. In some implementations, the digital signature can be formed using any well-known algorithm such as RSA, ECDSA, etc. In some implementations, the signature can be formed by signing a concatenation of the UID and nonce using a private key. In some implementations, this private key can be a local storage device private key. In some implementations, this local storage device private key can be generated based on a PUF value generated by the storage device, as described previously.

In step 308, method 300 can include validating the nonce.

In some implementations, step 308 can include the secure environment comparing the return nonce to the nonce sent in step 304. In some implementations, the secure environment can cache the nonce and then quickly compare the two nonce values to ensure that the nonce received is equal to the nonce sent. Since the nonce is unique and specific to the command sent in step 304, step 308 ensures that replay attacks cannot be successful.

In step 310, method 300 can include determining if the nonce is valid based on the comparison in step 308. If the nonce is determined to be invalid (for example, the returned nonce value in step 308 is not equal to the sent nonce value in step 304), method 300 can proceed to step 322 and can ignore the command received in step 302. In some implementations, method 300 can additionally prevent any future commands and raise an error.

In step 312, method 300 can include validating the UID returned by the storage device. As discussed in FIG. 2, the secure environment can store an expected UID that was set when the secure environment exchanged public keys with a storage device. In step 312, method 300 can compare the received UID with the expected UID to validate the returned UID.

If the UIDs match, method 300 can confirm that the returned UID is valid in step 314. Otherwise, if the UID is determined to be invalid, method 300 can proceed to step 322 and can ignore the command received in step 302. In some implementations, method 300 can additionally prevent any future commands and raise an error.

In step 316, method 300 can include validating the digital signature sent by the storage device. Method 300 can read the storage device public key that was exchanged using method 200 and use the stored public key to validate the signature of the UID and nonce value. Verification of a digital signature using a public key can be performed using any standard method. For example, method 300 can hash the concatenated UID and nonce value and then decrypt the signature using the stored public key to generate a second hash and compare the hashes to confirm that the signature is valid.

In step 318, method 300 can include determining if the digital signature is valid. If the digital signature is determined to be invalid, method 300 can proceed to step 322 and can ignore the command received in step 302. In some implementations, method 300 can additionally prevent any future commands and raise an error.

Finally, if the nonce, UID, and digital signature were all validated, method 300 can transmit or issue the command to the storage device for processing in step 320. As discussed, the command may be a read, write, or other type of command accessing the storage device.

While method 300 is described in the context of a secure environment validating a storage device, method 300 may be reversed to allow a storage device to validate a secure environment. For example, the storage device may generate and send a nonce to the secure environment which responds with its own UID, nonce, and signature. The storage device can then validate the UID, nonce, and signature in the same manner to confirm the identity of the secure environment.

Using the foregoing process, the public key and private key of both devices are generated by a PUF. Therefore, both devices are not cloneable and clone attacks (notably on the storage device) are prevented. Further, if a storage device is replaced, the secure environment will find out since the replacement storage device will not have the private key corresponding to the public key saved in the secure environment. Therefore, the replacement storage device cannot respond with the correct signature when the secure environment sent the nonce as a challenge. Thus, replacement attacks are prevented using the above methods. Further, the use of method 200 allows for the secure replacement of a storage device via a trusted intermediary.

Figure 4:
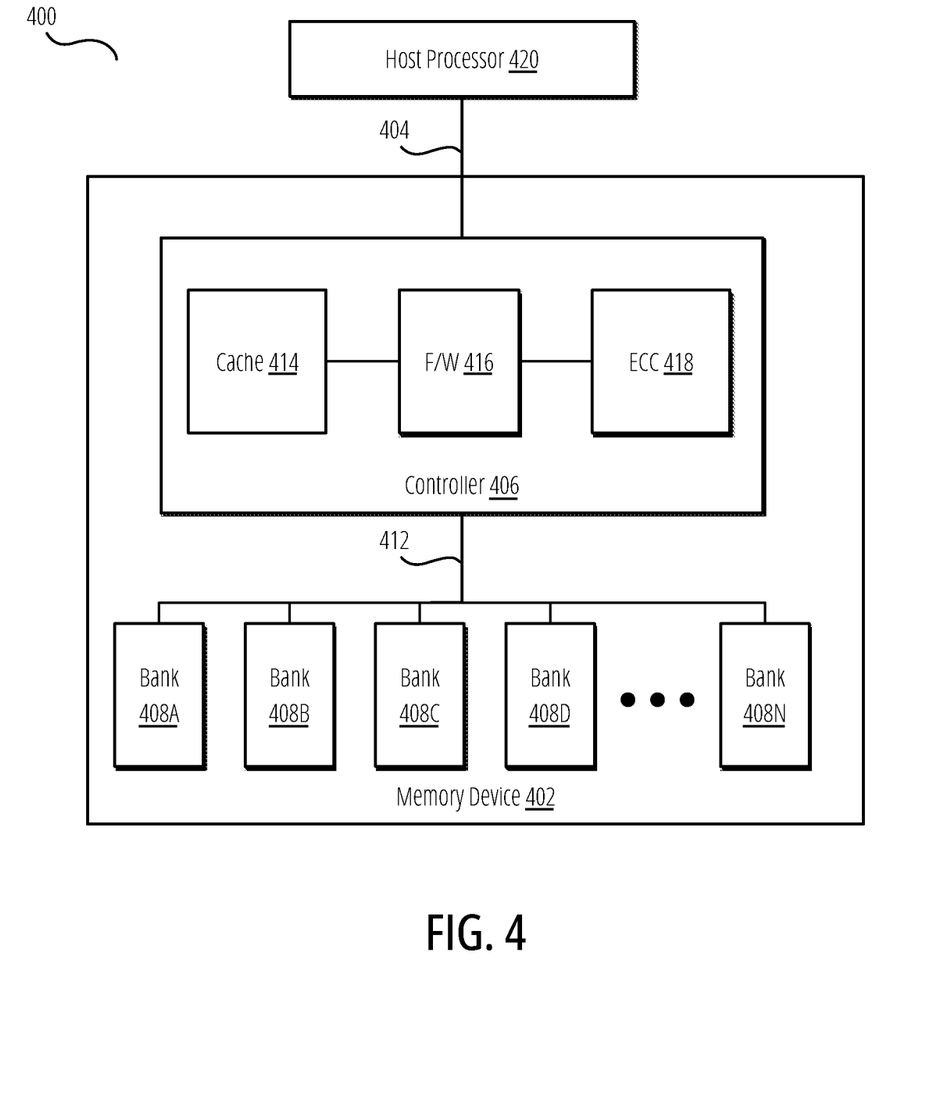
FIG. 4 is a block diagram illustrating a computing system according to some embodiments of the disclosure.

FIG. 4 is a block diagram illustrating a computing system according to some embodiments of the disclosure.

As illustrated in FIG. 4, a computing system 400 includes a host processor 420 communicatively coupled to a memory device 402 via a bus 404. The memory device 402 comprises a controller 406 communicatively coupled to one or more memory banks (e.g., bank 408A, bank 408B, bank 408C, bank 408D, bank 408N, etc.) forming a memory array via an interface 412. As illustrated, the controller 406 includes a local cache 414, firmware 416, and an ECC module 418.

In the illustrated embodiment, host processor 420 can comprise any type of computer processor, such as a central processing unit (CPU), graphics processing unit (GPU), or other types of general-purpose or special-purpose computing devices. The host processor 420 includes one or more output ports that allow for the transmission of address, user, and control data between the host processor 420 and the memory device 402. In the illustrated embodiment, this communication is performed over the bus 404. In one embodiment, the bus 404 comprises an input/output (I/O) bus or a similar type of bus.

The memory device 402 is responsible for managing one or more memory banks (e.g., bank 408A, bank 408B, bank 408C, bank 408D, bank 408N, etc.). In one embodiment, the memory banks (e.g., bank 408A, bank 408B, bank 408C, bank 408D, bank 408N, etc.) comprise NAND Flash dies or other configurations of non-volatile memory. In one embodiment, the memory banks (e.g., bank 408A, bank 408B, bank 408C, bank 408D, bank 408N, etc.) comprise a memory array.

The memory banks (e.g., bank 408A, bank 408B, bank 408C, bank 408D, bank 408N, etc.) are managed by the controller 406. In some embodiments, the controller 406 comprises a computing device configured to mediate access to and from banks (e.g., bank 408A, bank 408B, bank 408C, bank 408D, bank 408N, etc.). In one embodiment, the controller 406 comprises an ASIC or other circuitry installed on a printed circuit board housing the memory banks (e.g., bank 408A, bank 408B, bank 408C, bank 408D, bank 408N, etc.). In some embodiments, the controller 406 may be physically separate from the memory banks (e.g., bank 408A, bank 408B, bank 408C, bank 408D, bank 408N, etc.). The controller 406 communicates with the memory banks (e.g., bank 408A, bank 408B, bank 408C, bank 408D, bank 408N, etc.) over the interface 412. In some embodiments, this interface 412 comprises a physically wired (e.g., traced) interface. In other embodiments, the interface 412 comprises a standard bus for communicating with memory banks (e.g., bank 408A, bank 408B, bank 408C, bank 408D, bank 408N, etc.).

The controller 406 comprises various modules including local cache 414, firmware 416 and ECC module 418. In one embodiment, the various modules (e.g., local cache 414, firmware 416 and ECC module 418) comprise various physically distinct modules or circuits. In other embodiments, the modules (e.g., local cache 414, firmware 416 and ECC module 418) may completely (or partially) be implemented in software or firmware.

As illustrated, firmware 416 comprises the core of the controller and manages all operations of the controller 406. The firmware 416 may implement some or all of the methods described above. Specifically, the firmware 416 may implement the methods described in the foregoing figures.

Figure 5:
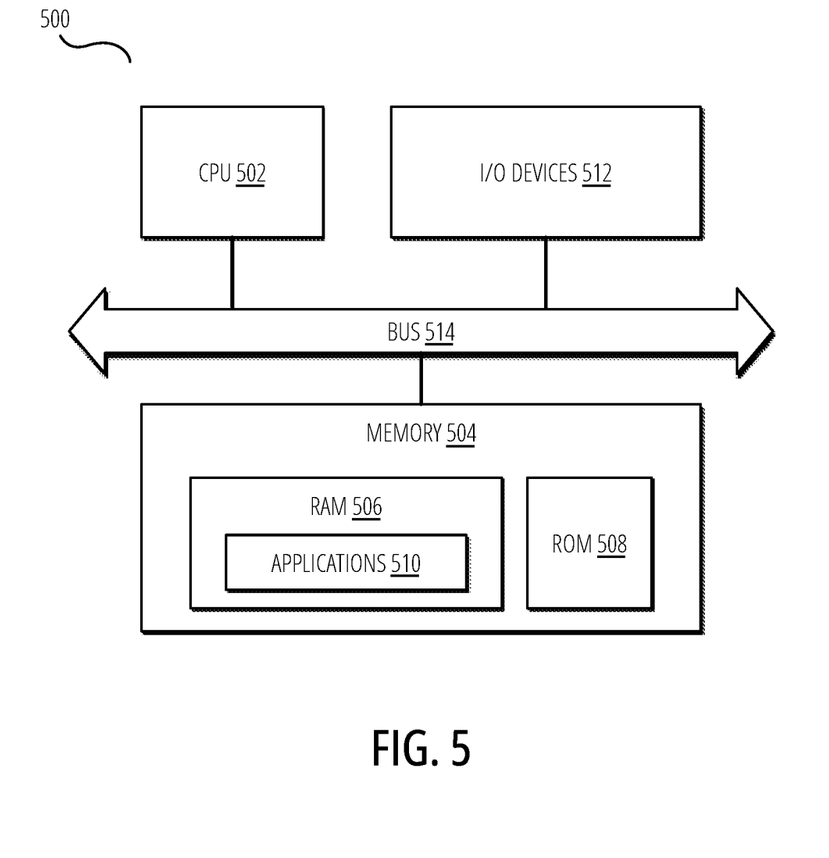
FIG. 5 is a block diagram of a computing device according to some embodiments of the disclosure.

FIG. 5 is a block diagram of a computing device according to some embodiments of the disclosure.

As illustrated, the device 500 includes a processor or central processing unit (CPU) such as CPU 502 in communication with a memory 504 via a bus 514. The device also includes one or more input/output (I/O) or peripheral devices 512. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 502 may comprise a general-purpose CPU. The CPU 502 may comprise a single-core or multiple-core CPU. The CPU 502 may comprise a system-on-a-chip (SoC) or a similar embedded system. In some embodiments, a graphics processing unit (GPU) may be used in place of, or in combination with, a CPU 502. Memory 504 may comprise a memory system including a dynamic random-access memory (DRAM), static random-access memory (SRAM), Flash (e.g., NAND Flash), or combinations thereof. In one embodiment, the bus 514 may comprise a Peripheral Component Interconnect Express (PCIe) bus. In some embodiments, the bus 514 may comprise multiple busses instead of a single bus.

Memory 504 illustrates an example of a non-transitory computer storage media for the storage of information such as computer-readable instructions, data structures, program modules, or other data. Memory 504 can store a basic input/output system (BIOS) in read-only memory (ROM), such as ROM 508 for controlling the low-level operation of the device. The memory can also store an operating system in random-access memory (RAM) for controlling the operation of the device.

Applications 510 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 506 by CPU 502. CPU 502 may then read the software or data from RAM 506, process them, and store them in RAM 506 again.

The device may optionally communicate with a base station (not shown) or directly with another computing device. One or more network interfaces in peripheral devices 512 are sometimes referred to as a transceiver, transceiving device, or network interface card (NIC).

An audio interface in peripheral devices 512 produces and receives audio signals such as the sound of a human voice. For example, an audio interface may be coupled to a speaker and microphone (not shown) to enable telecommunication with others or generate an audio acknowledgment for some action. Displays in peripheral devices 512 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 512 may comprise any input device arranged to receive input from a user. An illuminator in peripheral devices 512 may provide a status indication or provide light. The device can also comprise an input/output interface in peripheral devices 512 for communication with external devices, using communication technologies, such as USB, infrared, Bluetooth®, or the like. A haptic interface in peripheral devices 512 provides tactile feedback to a user of the client device.

A GPS receiver in peripheral devices 512 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 5, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

These computer program instructions can be provided to a processor of a general purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure a computer readable medium (or computer-readable storage medium) stores computer data, which data can include computer program code or instructions that are executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

I claim:

1. A device comprising:
    a storage device, the storage device including a first physically unclonable function (PUF) and configured to generate a storage device public key and a storage device private key; and
    a secure environment, the secure environment including a controller configured for:
        transmitting a nonce value to the storage device;
        receiving a response from the storage device, the response including a unique identifier (UID) and a digital signature, the digital signature generated using the UID and the nonce value;
        validating the digital signature using a public key of the storage device; and
        issuing a command to the storage device after validating the digital signature.

2. The device of claim 1, the controller further configured for receiving the command prior to transmitting the nonce value.

3. The device of claim 1, the controller further configured for receiving the storage device public key from the storage device in response to a signed replace key command, the signed replace key command received from a key management server and signed using a private key corresponding to a key management server public key stored by the secure environment and the storage device.

4. The device of claim 1, wherein the response further includes a copy of the nonce value and the controller is further configured for validating that the copy of the nonce value is equal to the nonce value.

5. The device of claim 1, the controller further configured for receiving a second response from a second storage device and disallowing a command accessing the second storage device upon determining that a second digital signature generated by the second storage device is not valid.

6. The device of claim 1, wherein the secure environment comprises a trusted execution environment and the storage device comprises one of a persistent storage device or a volatile storage device.

7. A method comprising:
    transmitting, by a secure environment, a nonce value to a storage device;
    receiving, by the secure environment, a response from the storage device, the response including a unique identifier (UID) and a digital signature, the digital signature generated using the UID and the nonce value;
    validating, by the secure environment, the digital signature using a public key of the storage device; and
    issuing, by the secure environment, a command to the storage device after validating the digital signature.

8. The method of claim 7, further comprising receiving the command prior to transmitting the nonce value.

9. The method of claim 7, wherein the public key of the storage device comprises a public key derived from a physically unclonable function of the storage device.

10. The method of claim 7, further comprising receiving the public key from the storage device in response to a signed replace key command, the signed replace key command received from a key management server and signed using a private key corresponding to a key management server public key stored by the secure environment and the storage device.

11. The method of claim 7, wherein the response further includes a copy of the nonce value and the method further comprises validating that the copy of the nonce value is equal to the nonce value.

12. The method of claim 7, further comprising receiving a second response from a second storage device and disallowing a command accessing the second storage device upon determining that a second digital signature generated by the second storage device is not valid.

13. The method of claim 7, wherein the secure environment comprises a trusted execution environment and the storage device comprises one of a persistent storage device or a volatile storage device.

14. A non-transitory computer-readable storage medium for tangibly storing computer program instructions capable of being executed by a computer processor, the computer program instructions defining steps of:
    transmitting, by a secure environment, a nonce value to a storage device;
    receiving, by the secure environment, a response from the storage device, the response including a unique identifier (UID) and a digital signature, the digital signature generated using the UID and the nonce value;
    validating, by the secure environment, the digital signature using a public key of the storage device; and
    issuing, by the secure environment, a command to the storage device after validating the digital signature.

15. The non-transitory computer-readable storage medium of claim 14, further comprising receiving the command prior to transmitting the nonce value.

16. The non-transitory computer-readable storage medium of claim 14, wherein the public key of the storage device comprises a public key derived from a physically unclonable function of the storage device.

17. The non-transitory computer-readable storage medium of claim 14, further comprising receiving the public key from the storage device in response to a signed replace key command, the signed replace key command received from a key management server and signed using a private key corresponding to a key management server public key stored by the secure environment and the storage device.

18. The non-transitory computer-readable storage medium of claim 14, wherein the response further includes a copy of the nonce value and the steps further comprise validating that the copy of the nonce value is equal to the nonce value.

19. The non-transitory computer-readable storage medium of claim 14, further comprising receiving a second response from a second storage device and disallowing a command accessing the second storage device upon determining that a second digital signature generated by the second storage device is not valid.

20. The non-transitory computer-readable storage medium of claim 14, wherein the secure environment comprises a trusted execution environment and the storage device comprises one of a persistent storage device or a volatile storage device.

* * * * *